(12) United States Patent
Davenport et al.

(10) Patent No.: US 6,491,067 B1
(45) Date of Patent: Dec. 10, 2002

(54) FLEXIBLE PROTECTIVE SLEEVE

(75) Inventors: Adrian Charles Davenport, Coventry (GB); Mark Cook, Loughborough (GB); John Molloy, Coventry (GB)

(73) Assignee: Federal-Mogul Technology Limited, Warwickshire (GB)

( * ) Notice: Subject to any disclaimer, the term of this patent is extended or adjusted under 35 U.S.C. 154(b) by 0 days.

(21) Appl. No.: 09/807,349

(22) PCT Filed: Oct. 7, 1999

(86) PCT No.: PCT/GB99/03317

§ 371 (c)(1),
(2), (4) Date: Jul. 11, 2001

(87) PCT Pub. No.: WO00/22340

PCT Pub. Date: Apr. 20, 2000

(30) Foreign Application Priority Data

Oct. 13, 1998 (GB) ............................................. 9822180

(51) Int. Cl.⁷ ................................................. F16L 9/14
(52) U.S. Cl. ....................... 138/110; 138/156; 138/151; 138/121
(58) Field of Search ................ 138/110, 114, 138/156, 151, 149, 118.1, 121

(56) References Cited

U.S. PATENT DOCUMENTS

| | | | | |
|---|---|---|---|---|
| 2,089,909 A | * | 8/1937 | Mansfield | 154/45 |
| 2,425,245 A | * | 8/1947 | Johnson | 121/36 |
| 3,060,069 A | * | 10/1962 | Sindars | 154/45 |
| 3,374,856 A | * | 3/1968 | Wirt | 181/42 |
| 3,711,632 A | * | 1/1973 | Ghirardi | 174/135 |
| 4,022,248 A | * | 5/1977 | Hepner et al. | 138/141 |
| 4,605,043 A | * | 8/1986 | Grenier | 138/149 |
| 4,713,271 A | * | 12/1987 | Searl et al. | 138/103 |
| 4,778,700 A | * | 10/1988 | Pereira | 138/151 |
| 5,122,401 A | * | 6/1992 | Finkelstein | 138/128 X |
| 5,123,453 A | * | 6/1992 | Robbins | 138/149 |
| 5,934,337 A | * | 8/1999 | Fiala et al. | 138/149 |

* cited by examiner

*Primary Examiner*—Patrick Brinson
(74) *Attorney, Agent, or Firm*—Synnestvedt & Lechner LLP

(57) ABSTRACT

A flexible protective sleeve for use in protecting an elongated member comprises a generally-tubular wall which has a longitudinally-extending slit therethrough. The sleeve also comprises a lining contained in the space enclosed by said wall. The lining also has a longitudinally-extending slit therethrough which provides access to the interior thereof. Said lining is formed by a preformed tube made of resilient material.

5 Claims, 1 Drawing Sheet

FLEXIBLE PROTECTIVE SLEEVE

This invention is concerned with a flexible protective sleeve for use in protecting an elongated member, such as a wire, a bundle of wires, or a pipe. Such sleeves, are substantially equally flexible at all points along their length and, conventionally, comprise a generally-tubular wall which at least substantially surrounds a space for receiving the elongated member.

Conventionally, flexible protective sleeves are used for protecting wires or pipes from contact with other components to avoid-undesirable noise generation and/or abrasion damage. Such sleeves may also act to insulate a member from heat. Such sleeves are used, for example, in the engine compartments of vehicles. Some flexible protective sleeves have a longitudinally-extending slit in their wall to provide access to the space. The slit enables an elongated member to be positioned in the sleeve without having to be inserted into one end of the sleeve.

This invention is applicable to flexible protective sleeves which have a longitudinally-extending slit. Such a sleeve may have a wall which is convoluted, ie its wall is formed from sheet-like material which is formed into convolutions to increase flexibility. Such a wall is normally formed from plastics material and has a diameter which varies in a regular manner along the length of the sleeve so that its exterior surface has a series of annular crests separated by troughs. When the sleeve bends, the crests move further apart on the outside of the curve and closer together on the inside of the curve. The invention is also applicable to flexible protective sleeves which have their walls formed from braided or woven filaments or yarns, such sleeves being well-known.

Although conventional flexible protective sleeves are effective in protecting elongated members contained therein from abrasion damage and, in many cases, reduce noise, the sleeves themselves can also be a source of noise, since they may vibrate against the elongated member causing an undesirable rattle and the edges of the longitudinally-extending slit may rub against one another creating noise. Various proposals have been made for reducing these noises. For example, the problem of reducing noise from such sleeves has been considered in EP 0 556 140 B where the proposed solution is to cover the wall of the sleeve with a strip of flexible sound-insulating material, eg a felt or a foam, which is wrapped around the wall of the sleeve and adhered thereto. The strip covers the outer surface of the wall and passes through the slit to cover the inner surface of the wall to which it is also adhered. Thus, the strip can cushion impacts between the interior surface of the wall and the elongated member and, since it passes through the slit, also cushions impacts between the edges of the slit. However, the use of such a strip has the disadvantages that: the process of applying the strip is complex especially the shaping and adhering of the strip to the interior surface; and the strip may become detached in service.

U.S. Pat. No. 5,727,599 A discloses a flexible protective sleeve having a convoluted wall including a longitudinal slit. The sleeve also comprises a sound-deadening inner member, eg made from sponge rubber. The inner member is die-cut from a sheet and adhered to the wall so that its opposite edges are separated from one another. This proposal suffers from the disadvantages that: the inner member does not completely surround the space within the sleeve; although the inner member can be pre-shaped to some extent by rolling, the process of applying the inner member is complex especially the shaping and adhering of the inner member to the wall; and the inner member may become detached in service.

It is an object of the present invention to provide a flexible protective sleeve in which the problem of noise mentioned-above is reduced or eliminated without incurring the above-mentioned disadvantages.

The invention provides a flexible protective sleeve for use in protecting an elongated member, said sleeve comprising a generally-tubular wall which at least substantially surrounds a space for receiving an elongated member, the wall having a longitudinally-extending slit therethrough which provides access to said space, characterised in that the sleeve also comprises a lining contained in said space, the lining having a longitudinally-extending slit therethrough which provides access to the interior thereof, said lining being formed by a pre-formed tube made of resilient material.

In a protective sleeve according to the invention, the lining is positioned to cushion impacts between the wall and the elongated member but, as it returns to its tubular form, is easy to install and, as no adhesive is used and the lining is at least substantially surrounded by the wall, the lining cannot become detached in service. A protective sleeve according to the invention can be used to provide very good thermal insulation and abrasion resistance in sleeves used for heating, ventilation and air conditioning lines. The lining is easily produced as an extruded tube.

In a sleeve according to the invention, the wall protects against abrasion damage. The wall may be formed from sheet plastics material and be convoluted. Such a wall may, therefore, be manufactured by the conventional methods used to manufacture sleeves of the convoluted type. It is also possible for the wall to be braided or woven from monofilament or multi-filament yarns.

The resilient material of the lining may be a polymeric foam which may, therefore, be manufactured by conventional methods used to manufacture pre-formed foam tubes for use as pipe insulation. For example, polyethylene foam may be used or PVC nitrile foam which is suitable for higher temperature applications. Foam is a good cushioning material and also improves thermal insulation.

Preferably, the lining has its longitudinally-extending slit aligned with the longitudinally-extending slit of the wall.

The lining may be oversize relative to the wall so that it holds the edges of the longitudinally-extending slit in said wall out of contact with one another, thereby preventing rubbing contact between the edges of the slit in the wall. Furthermore, in this case, the wall grips the lining preventing relative movement between the wall and the lining.

There now follows a detailed description, to be read with reference to the accompanying drawings, of a protective sleeve which is illustrative of the invention.

IN THE DRAWINGS

The illustrative sleeve 10 is a flexible protective sleeve for use in protecting an elongated member, such as a bundle of wires in the engine compartment of a vehicle.

Figure 1:
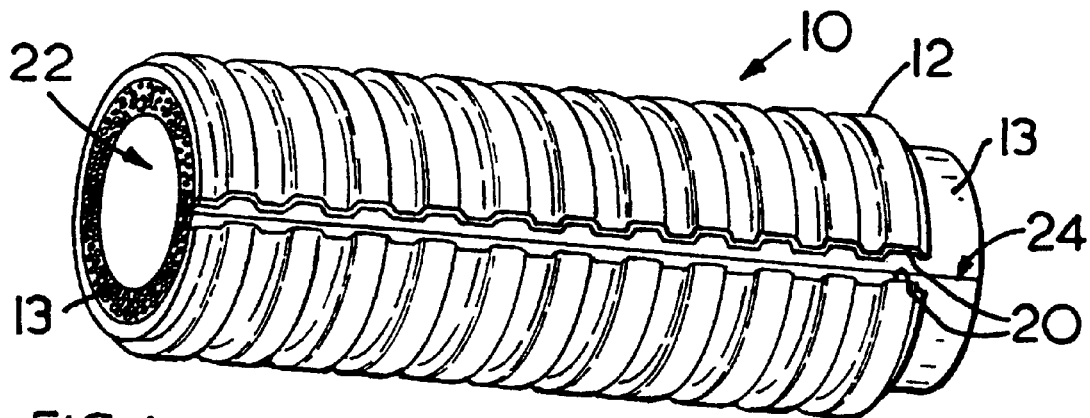
FIG. 1 is a perspective view of the illustrative sleeve.
Figure 2:
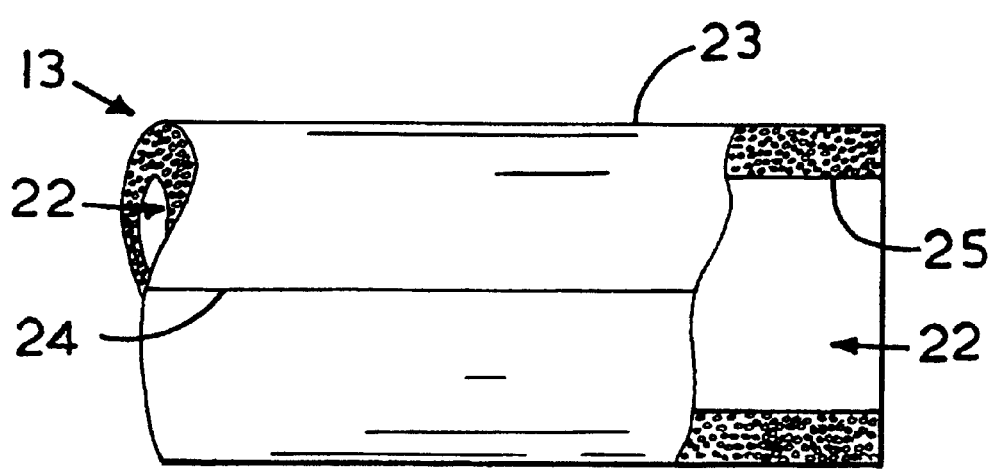
FIG. 2 is a side view, partly in section, of a lining of the illustrative sleeve.
Figure 3:
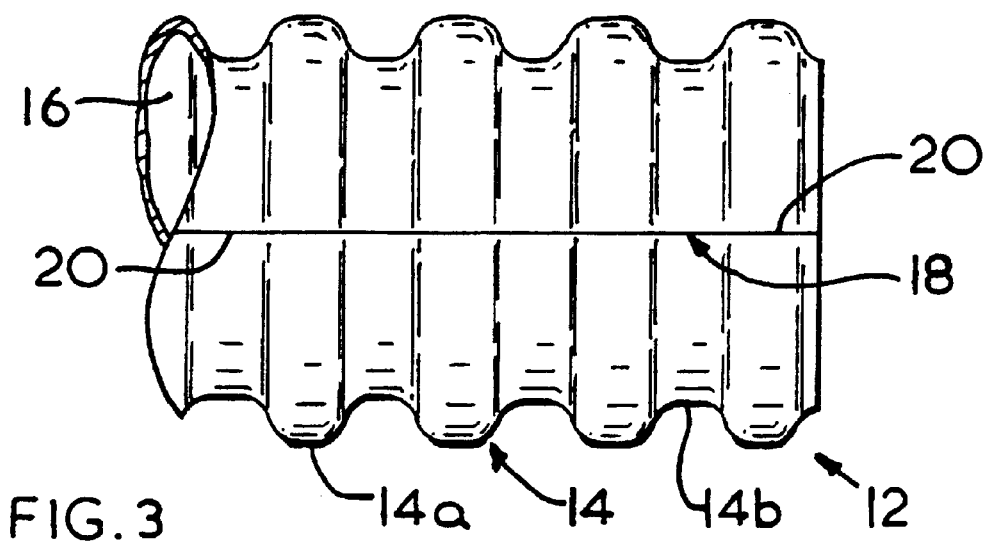
FIG. 3 is a side view of a tubular wall of the illustrative sleeve.

The sleeve 10 comprises a generally-tubular wall 12 which is shown in FIG. 3 and a lining 13 which is shown in FIG. 2.

The wall 12 is made from sheet-like plastics material, specifically nylon 6. The wall 12 has convolutions 14 to make it more flexible. These convolutions 14 extend circumferentially of the wall 12. Thus, the wall 12 has an outer surface formed by a series of annular crests 14*a* separated by troughs 14*b*. The wall 12 has a circular transverse cross-section at all points along its length but its radius varies, being greater at the crests 14a than at the troughs 14*b*. The wall 12 is identical to a commercially available sleeve and is formed by a well-known method involving expanding an extruded tube into a die formed with convolutions.

The wall 12 substantially surrounds a space 16 for receiving an elongated member. The wall 12 has a longitudinally-extending slit 18 therethrough which provides access to the space 16. This is a well-known feature which allows the sleeve 10 to be installed over an elongated member which is in situ and, in the case where the elongated member is a bundle of wires, allows wires to leave the sleeve 10 at various points. The wall 12 is shown in FIG. 3 in an initial condition thereof (before it is assembled with the lining 13). In its initial condition, edges 20 of the slit 18 are in contact with one another so that the wall 12 completely surrounds the space 16. However, when the wall 12 is distorted to open the slit 18 by moving the edges 20 apart, the wall 12 does not completely surround the space 16.

As mentioned above, the sleeve 10 also comprises a lining 13. The lining 13 is made from resilient polyethylene foam which is preformed into the shape of a tube, ie the undistorted shape of the lining 13 is a free-standing cylindrical tube with a wall-thickness of 5 mm. Thus, the lining 13 has an external cylindrical surface 23 and an internal cylindrical surface 25 which surrounds a cylindrical space 22. The radius of the external surface 23 of the lining 13 is slightly greater than that of the bottoms of the troughs 14*b* of the convolutions 14 of the wall 12, ie the lining 13 is oversize relative to the wall 12. The lining 13 also has a longitudinally-extending slit 24 therein through which access may be gained to the space 22. The slit 24 has edges which, in the undistorted state of the lining 13, engage one another.

The assembly 10 is assembled by passing the lining 13 through the slit 18 of the wall 12 until the lining 13 is contained in the space 16. This requires the deformation of both the wall 12 and the lining 13 but they return to their preformed shapes except that, because of the radius of the external surface 23 of the lining 13 is greater than the radius of the trough bottoms 14*b* of the wall 12, the wall 12 is held in a slightly distorted shape in which the edges 20 of the slit 18 are held apart by a short distance. Thus, the lining 13 is oversize relative to the wall 12 so that it holds the edges 20 of the slit 18 out of contact with one another, thereby preventing noise from being generated by rubbing contact between the edges 20.

When the lining 13 is inserted into the space 16, the slit 24 of the lining 13 is kept in alignment with the slit 18 of the wall 12 so that an elongated member can readily be passed through the slits 18 and 24 into the space 22.

What is claimed is:

1. A flexible protective sleeve for use in protecting an elongated member, said sleeve comprising a generally-tubular wall which at least substantially surrounds a space for receiving an elongated member, the wall having a longitudinally-extending slit therethrough which provides access to said space, wherein the sleeve also comprises a lining contained in said space, the lining having a longitudinally-extending slit therethrough, the slit having yieldable side edges in face-to-face engagement providing access to the interior thereof, said lining being formed by a pre-formed extruded tube made of resilient cushioning material.

2. A sleeve according to claim 1, wherein the wall is formed from sheet plastics material and is convoluted.

3. A sleeve according to claim 1, wherein the resilient material is a foam.

4. A sleeve according to claim 1, wherein the lining has its longitudinally-extending slit aligned with the longitudinally-extending slit of the wall.

5. A flexible protective sleeve for use in protecting an elongated member, said sleeve comprising a generally-tubular wall which at least substantially surrounds a space for receiving an elongated member, the wall having a longitudinally-extending slit therethrough which provides access to said space, wherein the sleeve also comprises a lining contained in said space, the lining having a longitudinally-extending slit therethrough, the slit having yieldable side edges in face-to-face engagement providing access to the interior thereof, said lining being formed by a pre-formed extruded tube made of resilient cushioning material and is oversize relative to the wall so that it holds the edges of the longitudinally-extending slit in said wall out of contact with one another.

\* \* \* \* \*